Feb. 3, 1959  E. G. MATKINS  2,872,618
LOW VOLTAGE LIGHT SENSITIVE CONTROL SYSTEM
Filed June 14, 1954
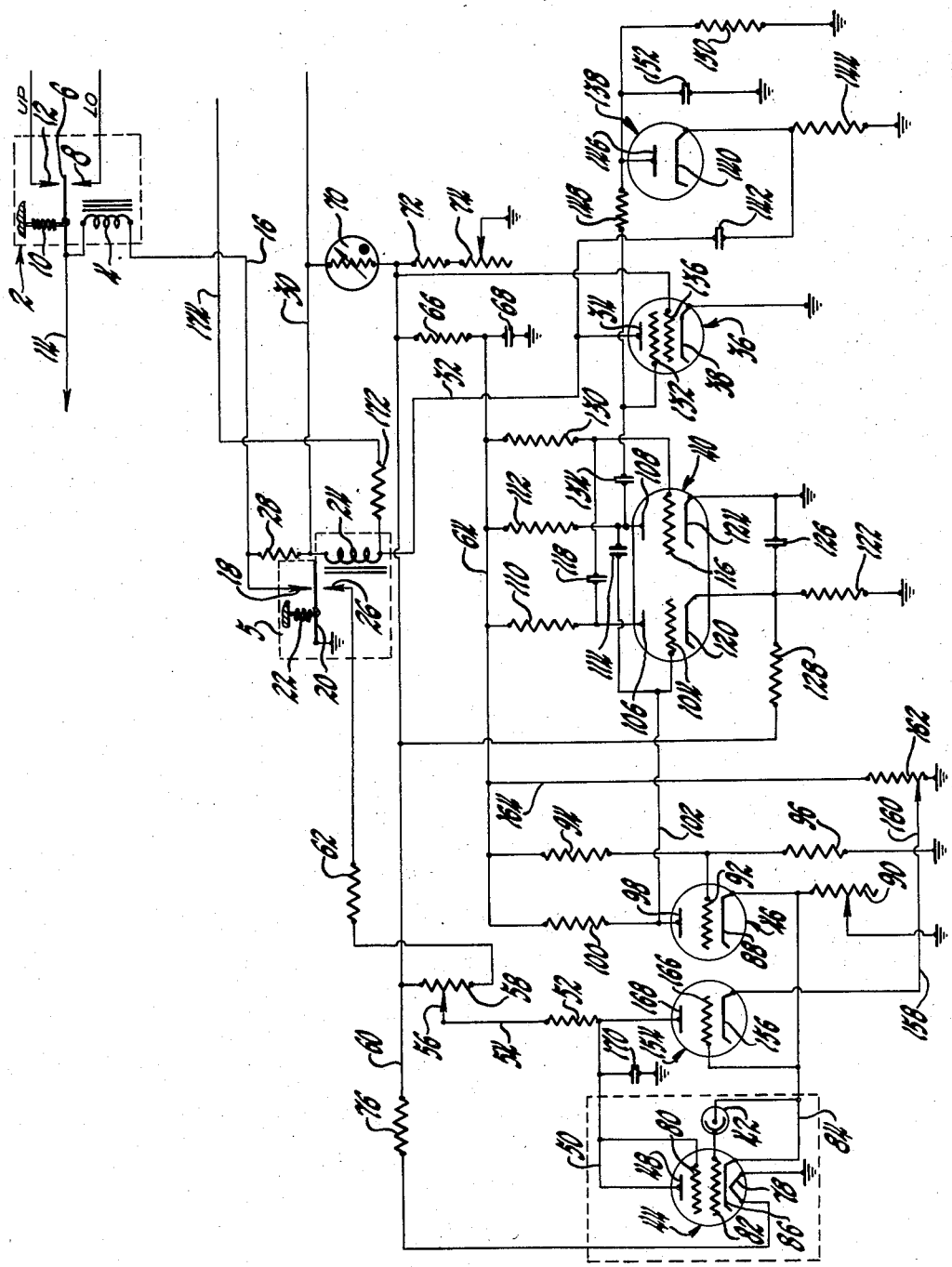
INVENTOR
Eugene G. Matkins
BY
R. E. Fowler
ATTORNEY

2,872,618

LOW VOLTAGE LIGHT SENSITIVE CONTROL SYSTEM

Eugene G. Matkins, Reelsville, Ind., assignor to General Motors Corporation, Detroit, Mich., a corporation of Delaware Application June 14, 1954, Serial No. 436,371

11 Claims. (Cl. 315—83)

This invention relates to light sensitive control means and more particularly to a light actuated control circuit for use in the automatic dimming of automotive headlamps. Systems utilized for the control of the dual filaments of automotive headlamps causing them to switch from high to low beam on the approach of vehicles from the opposite direction are currently on the market. This type, however, have utilized photosensitive and electronic means which necessitates voltages higher than that of the normal vehicle system. While for some years the conventional battery voltage in automotive vehicles was six volts, recently many vehicles have been placed on the market in which a twelve volt supply has been incorporated. However, automatic headlight dimmer means now on the market have necessitated much higher voltages and the automatic dimming systems have included a vibrator power supply means for increasing the battery voltage to the needed higher voltages.

It is an object in making the present invention to provide a light sensitive control system in which all of the components require no more than the normal voltage supplied by the battery or generator of an automotive vehicle.

It is a further object in making this invention to provide means for automatically switching the headlamps of an automotive vehicle from high to low beam upon receipt of an incident light which will operate from the normal battery voltage.

It is a still further object in making this invention to provide a light sensitive control system in which an oscillator is turned on and off to control a relay by the amounts of light incident upon a photocell connected thereto.

With these and other objects in view which will become apparent as the specification proceeds, my invention will be best understood by reference to the following specification and claims and the illustrations in the accompanying drawings, in which the figure is a circuit diagram of a control system embodying my invention.

Referring now more particularly to the figure, the circuit disclosed incorporates in the main a power relay 2 whose operation switches the energization circuit for the high and low beam filaments. The power relay 2 is controlled in turn by a sensitive relay 5. The sensitive relay is controlled by the light sensitive system. The light sensitive system itself is made up of two separate units, first a unit which is mounted in some position on the vehicle so that it may be in a position to accept the incident light from approaching vehicles. The second portion of the system embodies amplifying and electronic control means for operating the sensitive relay. In the main the system consists of an oscillator, which in this particular construction takes the form of a multivibrator, which is deenergized when no light falls on the pickup unit, but which becomes energized to produce pulsating current when a sufficient amount of light is received. The output of the oscillator controls a power tube in circuit with the sensitive relay to cause it to be actuated.

With this basic description and now referring more particularly to the structure, the power relay 2 consists of an energizing coil 4 which moves an armature 6 downwardly to engage a stationary contact 8 when the coil 4 is energized. When the coil 4 is deenergized, a spring 10 pulls the armature away from the energizing coil 4 and into contact with a spaced stationary contact 12. The armature 6 is directly connected to the battery or power source through line 14. Stationary contact 8 is connected directly to the low beam filaments indicated as LO and stationary contact 12 is connected directly to the high or upper beam filaments indicated as UP. Thus, when the relay coil 4 is energized, the low beam filaments will be in circuit, and when deenergized the upper beams will be illuminated. Coil 4 has one terminal connected directly to line 14, and its opposite terminal connected through conductor 16 to a stationary contact 18 of sensitive relay 5. This contact is adapted to be engaged by movable armature 20 of the sensitive relay when the biasing spring 22 pulls it away from the energizing coil. The energizing coil 24 of relay 5 actuates the armature 20 to pull it into contact with front stationary contact 26 when energized. Armature 20 is grounded.

A resistor 28 is connected between line 16 and the main input power line 30, which is attached to the battery or other D. C. source. One end of the energizing coil 24 is likewise connected to power line 30, the opposite terminal of the coil being connected through line 32 to plate 34 of the power amplifier tube 36, the cathode 38 of said tube being connected to ground. Thus, when there is sufficient conduction through tube 36, the coil 24 will be energized and when the conduction falls below a predetermined level, coil 24 will drop its armature 20.

The power amplifier tube 36 is controlled in turn by an oscillator of the multivibrator type, which is shown in general as including the duo-triode tube 40, which is, in the no-light condition, deenergized or inoperative, but which is quickly energized by the receipt of a sufficient amount of light on the control photocell 42. The output of phototube 42 is first amplified through a pre-amplifier stage including tube 44, and then applied through a cathode follower connection to a grounded grid amplifier stage including tube 46, the output of the latter controlling the oscillations of the multivibrator.

Returning to the light cell and its associated pre-amplifier stage, the tube 44 has its plate 48 connected through line 50 to one terminal of a dropping resistor 52. The dropping resistor is also connected through line 54 to the adjustable tap 56, which may be moved over a resistance 58 to form a potentiometer. One end of the resistor 58 is connected to a supply line 60, and the other end through resistor 62 to stationary contact 26 of the sensitive relay 5. It is desired to point out at this time that there are three supply lines in the circuit, one which receives the normal battery voltage which is indicated at line 30, a second which receives regulated voltage from the main supply line 30 and is identified as 60 and may be referred to as the regulated line, and a third indicated as 64, which receives its supply from the regulated line 60, but in addition is also filtered, the filter being shown as resistance 66 interconnected between lines 60 and 64, and a condenser 68 connected between line 64 and ground. A ballast tube 70 is provided between main supply line 30 and regulated line 60 to regulate the voltage of the latter. A resistance 72, in series with a variable potentiometer 74, is connected between line 60 and ground to adjust the voltage of the regulated line.

The potential of plate 48 is, therefore, supplied through regulated line 60. This line is also connected through resistance 76 to filament 78 of the pre-amplifier stage 44, the opposite side of which is grounded. The screen grid 80 of the tube 44 is directly connected to line 50. The control grid 82 is connected to the cathode of the light sensitive cell 42, the anode of that tube being connected to a conductor 84, which is also connected to cathode 86 of the tube 44. The photoelectric cell, therefore, determines the potential on the control grid 82, and therefore conductance through this pre-amplifier stage.

The output of the pre-amplifier is taken off as a cathode follower through conductor 84, and is applied to cathode 88 of the grounded grid amplifier tube 46. A variable potentiometer 90 is connected between conductor 84 and ground to adjust the basic sensitivity of the system. The control grid 92 of the tube 46 is connected to a point intermediate resistors 94 and 96, the opposite terminal of resistor 96 being connected to ground and the opposite terminal of resistor 94 being connected to the regulated and filtered supply line 64. The plate 98 of the tube 46 is connected through dropping resistor 100 to supply line 64 and also through conductor 102 to the control grid 104 of the first section of the multivibrator.

The two plates 106 and 108 of the tube 40 are connected to the supply line 64 through dropping resistors 110 and 112 respectively. Plate 108 is connected back to the first grid through condenser 114 and plate 106 is connected to the second control grid 116 through condenser 118 to form a conventional multivibrator circuit. The cathode 120 of the first triode section is connected to ground through resistor 122. Cathode 124 of the second triode section is connected directly to ground. A condenser 126 is connected between cathodes 120 and 124. A resistor 128 is connected between cathode 120 and supply line 60 to provide bias therefor. A biasing resistor 130 is connected between control grid 116 and the regulated and filtered supply line 64. The output of the multivibrator section just described is a series of pulses and is applied to control grid 132 of the power amplifier through coupling condenser 134. An assisting grid or screen 136 of the power amplifier 36 is connected directly to regulated line 60. The operation of the basic system so far described is as follows. When no incident light falls upon the photocell 42, the pre-amplifier stage 44 is non-conductive from an operating standpoint, and the potential on the cathode 88 of the grounded grid tube 46 is sufficiently low so that that stage is conductive. The potential of plate 98 is therefore relatively low, which potential determines the potential of the control grid 104 of the multivibrator, and the same is deenergized and nonoscillating. At the same time the system is so designed that the power tube 36 passes sufficient current to energize relay coil 24, which attracts its armature 20, holding it against the front contact 26. Since the back contact 18 is unconnected, the power relay coil 4 is deenergized and the spring 10 holds the armature 6 against contact 12 to complete an obvious circuit to the upper or high beams.

However, upon the approach of a vehicle and light falling on photocell 42, the resistance of the same is decreased, which increases the potential on control grid 82 until the tube 44 becomes conductive. When this tube conducts the voltage on cathode 86 rises, which increase in voltage is applied through conductor 84 to cathode 88 of the amplifier 46. Upon the rise in voltage of cathode 88, this tube becomes non-conductive, decreasing the flow of current through the plate circuit thereof and, therefore, increasing the potential of the plate. Since this plate 98 is directly connected to control grid 104 of the multivibrator, the first stage of the multivibrator becomes conductive and the multivibrator section goes into operation, producing in its output a series of pulses in a conventional manner. These pulses acquire a given amplitude almost immediately and retain the same amplitude even though more and more light may fall on the phototube to increase the cathode potential in tube 46.

Upon the production of these pulses the output of the multivibrator is applied to the control grid 132 of the power tube 36, and while these pulses are positive in nature, due to the rectifying action of the cathode 38 and grid 132, they apply a negative bias to the tube 36, causing the conduction therethrough to be reduced and the tube to cut off, deenergizing relay coil 24 and permitting armature 20 to move from contact 26 into engagement with contact 18. This completes an obvious circuit through energizing coil 4 of the power relay which attracts its armature 6, pulling it into engagement with stationary contact 8 and away from stationary contact 12. This breaks the supply circiut to the upper or high beam filaments and completes a circuit to the low beam; thus, the approaching car causes the system to switch from high to low beam. The resistance 28 absorbs the inductive surge from the relay coil 4 and protects the points 18.

Since it is desired to supply the multivibrator with power from the filtered regulated line 64, the applied potential will be less than if it were supplied directly from the main power line 30. As an example of possible voltages appearing on these lines, when a normal 12-volt supply is connected to line 30, approximately 8 volts may be available on regulated supply line 60, and 7½ volts on regulated filtered supply line 64. These values are, of course, only exemplary, and may take other values. Since, however, the multivibrator is powered by line 64, which carries the lowest voltage, the amplitude of the pulses supplied by this type of oscillator to control grid 132 may not be of quite sufficient amplitude to positively cut off conduction through tube 36 and give proper response in the sensitive coil 24.

In order to assist the control pulses on control grid 132, I have incorporated an assisting circuit which includes a diode 138, the cathode 140 of which is connected through a condenser 142 with the plate 34 of the power amplifier tube 36. Cathode 140 is also connected through resistor 144 to ground. The anode 146 of tube 138 is connected back through resistor 148 to the control grid 132. The plate 146 is also connected to ground through resistance 150 and condenser 152 in parallel, which form a type of filter circuit whose purpose will be later described. In general this assist circuit takes a pulse from the output circuit of the amplifier tube 36, rectifies it, and applies a further negative bias to the control grid 132 in phase with the bias produced by the multivibrator to add to the amplitude on the control grid and thus assure definite cutoff. The condenser 152 provides a delaying action so that the output of the rectifier produces a type of floating D. C. bias assisting the output of the multivibrator. Through this action, therefore, the conductance through the power tube is quickly varied over a relatively wide amplitude to provide positive control.

In the operation of the circuit which has been described to this point, a certain amount of inertia existed in the phototube and pre-amplifier stage when light was suddenly removed from the phototube. The incidence of considerable light on the phototube caused by the nearness of the aproaching vehicle made the potential on the control grid 82 almost the same as that on the cathode 86. Thus, when this intense light was suddenly removed and the resistance of the phototube 42 increased appreciably, the potential on the grid could not change rapidly to quickly decrease the conductance in the tube, which would cause the multivibrator to turn off.

Since it is desirable to have the system return to upper beam as soon after the approaching vehicle has passed as possible, a further section has been incorporated. This includes a triode tube 154 which may be termed the control tube. The cathode 156 of this tube is connected through conductor 158 with variable tap 160 on a resistor 162 to form a potentiometer. One terminal of the resistor 162 is connected to ground and the other terminal through conductor 164 to the regulated and filtered supply line 64. The control grid 166 of the tube 154 is directly connected to conductor 84, which is the cathode follower line from the pre-amplifier. The plate 168 of tube 154 is connected to conductor 50, and a condenser 170 is connected between conductor 50 and ground. This circuitry is designed to assist in causing the pre-amplifier 44 to become non-conductive upon the removal of light on the photoelectric tube 42, and it accomplishes this result by decreasing the plate voltage on plate 48 as the light becomes very intense, so that it is easier for the grid 82 to cut off the tube than it would be otherwise.

The operation is as follows. Assuming again a no-light condition, the tube 44 would be non-conductive and the tube 46 would be conductive, maintaining a sufficiently low potential on plate 98 and the attached control grid 104 to keep the multivibrator turned off. If now incident light hits the photocell 42, causing the grid 82 to become more positive and the tube 44 to become conductive, then the potential on the cathode follower conductor 84 increases. The first result is, of course, the increase in the potential of the attached cathode 88 of the tube 46 to turn on the multivibrator, as before described. At this same time this same potential is applied directly to control grid 166 of the control tube 154. However, the tube is so biased by the adjustment of potentiometer 160—162 that for some time after the multivibrator is placed in operation and the power relay has been actuated to switch to low beam, that this tube 154 still remains non-conductive.

As the approaching car comes nearer and nearer and the intensity of light on the photocell is high, then the grid potential on 166 reaches a point so that the tube may conduct. When this occurs it is obvious that the potential on the plate 168 will be materially reduced, and since this plate 168 is directly connected to plate 48 of the pre-amplifier tube 44, the potential on that plate will also be materially reduced. Thus, when the approaching vehicle passes and light is suddenly removed from the photocell, the plate 48 will be relatively low and the control grid 82 can move easily to shut this tube off. The condenser 170 connected to the line 50 serves as a time delay means so that this lowered potential may be maintained on the plate 48 long enough to produce the desired action, while it also provides, with resistor 52, a suitable filtering action for the plate supply of these tubes 44 and 154, since their supply comes from the line 60.

It might also be mentioned at this point that resistor 122 and condenser 126, which are in the cathode circuits of the multivibrator, also provide a ripple filter for the supply to the multivibrator as well as a bypass.

It was previously mentioned that the adjustment of the potentiometer 90 determines the basic sensitivity of the control system, which, of course, remains the same during normal operation and is ordinarily referred to as the "hold" sensitivity. Since in systems of this type it is necessary to provide a system which is several times more sensitive after it has switched to "dim" position than it was before, so that minor fluctuations in incident light will not cause it to switch back to high beam, I have also provided an adjustable potentiometer for determining the sensitivity of the system under "no-light" condition. This is the potentiometer 56—58 which is in circuit when the sensitive coil 24 is energized, and which is removed from the circuit when the sensitive relay 24 is deenergized to cause a switching to low beam. The removal of a portion of the resistance 58 and the series resistance 62 in this circuit causes a variation in voltage supplied to the pre-amplifier tube, and therefore a change in sensitivity of the system. Thus, it is, for example, ten times as sensitive with resistances 58 and 62 removed as it is when they are in circuit, so that if the oncoming driver dims and there is a reduction of incident light, the system will still remain on low beam.

Since there are certain occasions during which the operator may wish to override this automatic control and to switch in the high beams due to the approaching driver refusing to dim his headlamps, I have provided an override circuit. This circuit consists of a resistor 172, one terminal of which is connected to one end of the relay coil 24 adjacent the plate of the power amplifier tube output, and the other terminal of which is connected through line 174 to any manually operated switch (not shown) which merely grounds the line. It is obvious that upon the grounding of line 174 a direct energizing circuit is provided through relay coil 24 to close its armature 20 on contact 26, regardless of any other circumstances. As long as such a switch is closed, the system will therefore stay on upper beam, and will return to lower beam only when manually released if there is still incident light impinging on the front of the vehicle and photocell 42.

I claim:

1. In a light sensitive control system, a source of electrical power, a light sensitive cell, an electron tube having a plate, grid and cathode, said plate being connected to said source of power and said cell across said grid and cathode, an oscillator normally biased to cutoff connected to said source of power and having an input and an output circuit, means interconnecting the cathode of the tube to the input of the oscillator so that the voltage of the cathode will control the latter to cause the same to oscillate when a predetermined level of light falls on the cell but be non-oscillatory below that light level, a second electron tube having a cathode, grid and plate, the plate being connected to the plate of the first named tube, adjustable biasing means connected to the cathode of the second tube, and means connecting the grid of the second tube to the cathode of the first so that conduction through the second tube will be controlled by cathode voltage of the first tube and will change the voltage applied across the first tube.

2. In a light sensitive control system, a source of electrical power, a light sensitive cell, an electron tube having a plate, grid and cathode, said plate being connected to said source of power and said cell across said grid and cathode, an oscillator normally biased to cutoff connected to said source of power and having an input and an output circuit, means interconnecting the cathode of the tube to the input of the oscillator so that the voltage of the cathode will control the latter to cause the same to oscillate when a predetermined level of light falls on the cell but be non-oscillatory below that light level, a second electron tube having a cathode, grid and plate, the plate being connected to the plate of the first-named tube, adjustable biasing means connected to the cathode of the second tube, means connecting the grid of the second tube to the cathode of the first so that conduction through the second tube will be controlled by cathode voltage of the first tube and will change the voltage applied across the first tube, and time delay means connected to the common plate circuit to maintain a given condition for a predetermined time.

3. A light sensitive control system comprising a source of low voltage electrical power, a light sensitive cell, an electron tube having a plate, grid and cathode, said plate being connected to the source of power and said light cell connected between the grid and cathode to affect the flow of current through the tube, a second electron tube having a plate, grid and cathode, conductive means interconnecting said cathodes, potentiometer means connecting said conductive means to ground to vary the bias, and oscillator means connected to the source of power and to the plate of the second tube, said oscillator being normally non-conductive but controlled by the plate voltage to oscillate, dependent upon the amount of light falling on the light cell.

4. A light sensitive control system comprising a source of electrical power, a light sensitive cell, an electron tube having a plate, grid and cathode, said plate and cathode being connected to the source of power and said light cell connected between the grid and cathode to affect the flow of current through the tube, a second electron tube having a plate, grid and cathode, said second plate being connected to the plate of the first tube, means for adjusting the bias on said second cathode, conductive means interconnecting the grid of the second tube with the cathode of the first to control the conductivity through said second tube in accordance with the conductivity in said first tube so that current flow through the second tube will determine the potential applied across said first tube.

5. A light sensitive control system comprising a source of electrical power, a light sensitive cell, an electron tube having a plate, grid and cathode, said plate and cathode being connected to the source of power and said light cell connected between the grid and cathode to affect the flow of current through the tube, a second electron tube having a plate, grid and cathode, said second plate being connected to the plate of the first tube, means for adjusting the bias on said second cathode, conductive means interconnecting the grid of the second tube with the cathode of the first to control the conductivity through said second tube in accordance with the conductivity in said first tube so that current flow through the second tube will determine the potential applied across said first tube, and time delay means connected to the common plate circuit of the tubes to maintain a given condition for a predetermined length of time.

6. A light sensitive control system comprising a source of electrical power, a light sensitive cell, an electron tube having a plate, grid and cathode, said plate and cathode being connected to the source of power and said light cell connected between the grid and cathode to affect the flow of current through the tube, a second electron tube having a plate, grid and cathode, said second plate being connected to the plate of the first tube, means for adjusting the bias on said second cathode, conductive means interconnecting the grid of the second tube with the cathode of the first to control the conductivity through said second tube in accordance with the conductivity in said first tube so that current flow through the second tube will determine the potential applied across said first tube, a third electron tube having a plate, grid and cathode, said third cathode being connected to the cathode of the first tube and the third plate to the source of power, an oscillator biased to cutoff and having a control grid, said oscillator control grid being connected to the plate of the third-mentioned tube to vary the potential on the oscillator and to cause it to oscillate at a particular output of the first tube, power amplifying means connected to the output of the oscillator, and relay switching means connected to the power amplifier and controlled by the flow of current therethrough to control desired apparatus in accordance with the amount of light falling on the light cell.

7. In a control system for controlling a vehicle headlamp having multiple filaments, switching means connected to said filaments, a source of low voltage power connected to said switching means, operating means for said switching means, an amplifying tube in whose output the operating means is connected, an oscillator connected to the source of power and to the input of the amplifying tube, a photoelectric cell, a second electron tube having a plate, grid and cathode, said plate and cathode being connected to the source of power and said photoelectric cell between the grid and cathode to control the current flow through said tube, a third electron tube having a plate, grid and cathode, said cathode being connected to the cathode of the second tube, variable biasing means connected to said common cathode circuit, and conductive means connecting the plate of the third electron tube to the oscillator input to control conductive periods thereof depending upon the amount of light falling on the photocell.

8. In a control system for controlling a vehicle headlamp having multiple filaments, switching means connected to said filaments, a source of low voltage power connected to said switching means, operating means for said switching means, an amplifying tube in whose output the operating means is connected, an oscillator connected to the source of power and to the input of the amplifying tube, a photoelectric cell, a second electron tube having a plate, grid and cathode, said plate and cathode being connected to the source of power and said photoelectric cell between the grid and cathode to control the current flow through the same, a third electron tube having a plate, grid and cathode, said cathode being connected to the cathode of the second tube, variable biasing means connected to said common cathode circuit, conductive means connecting the plate of the third electron tube to the oscillator input to control conductive periods thereof depending upon the amount of light falling on the photocell, and means connected in the plate circuit of the second named electron tube to vary the potential of the plate depending upon the amount of light falling on the photosensitive cell after a predetermined threshold of light has been reached.

9. In a light sensitive control system, relay switching means connected to apparatus to be controlled, a source of electrical power connected to the switching means, actuating means for the switching means, an oscillator having an input and an output circuit, said output circuit being connected to actuating means to control the same, a light sensitive cell, an electron tube having a plate, grid, and cathode, the plate and cathode being connected to said source of power, and said sensitive cell between the grid and cathode to control the current flow through the tube, conductive means connecting the cathode to the oscillator input and controlling said oscillator by cathode voltage, and means connected to the plate circuit of the tube to vary the potential on the plate depending upon the intensity of light falling on the photocell.

10. In a light sensitive control system, a voltage source, a pair of amplifying means each having an input and an output circuit, a voltage dropping impedance, said output circuits being connected across said voltage source through a common circuit path which includes said impedance, a photocell connected in the input circuit of the first amplifying means for controlling the conduction of its output circuit in accordance with the intensity of the light incident upon the photocell, the input circuit of the second amplifying means being connected to the output circuit of the first amplifying means so that the light-induced variations of said photocell produce a signal voltage in the input circuit of the second amplifying means, biasing means in the input circuit of the second amplifying means to prevent conduction in its output circuit until said signal voltage reaches a predetermined value, said output circuits being simultaneously conductive upon the occurrence of said value whereby the voltage drop across said impedance increases thereby decreasing the voltage across the output circuit of the first amplifying means to alter its sensitivity to changes in said photocell.

11. In a control system for a vehicle headlamp having multiple filaments, the combination including a voltage source, switching means connected to said filaments, a pair of amplifying means each having an input circuit and an output circuit, a voltage dropping resistor, said output circuits being connected in parallel across said voltage source through said resistor, a photocell connected in the input circuit of the first amplifying means for controlling the conductance of its output circuit in accordance with the intensity of light incident upon the photocell, the output circuit of the first amplifying means being connected to the input circuit of the second amplifying means so that the light-induced variations of said photocell changes the conductance through the output circuit of the second amplifying means and said impedance whereby the voltage across the output circuit of the first amplifying means is reduced to change its sensitivity to changes in said photocell, and time delay means including a condenser connected across said output circuits tending to maintain the reduced voltage thereacross whereby a sudden decrease of light intensity upon said photocell is instantly effective to change the conductance of the first amplifying means, said switching means being connected with the output circuit of said first amplifying means and responsive to the change in conductance thereof to alternately energize said multiple filaments.

References Cited in the file of this patent

UNITED STATES PATENTS

| | | |
|---|---|---|
| 2,284,024 | Stevens | May 26, 1942 |
| 2,312,127 | Shepard | Feb. 23, 1943 |
| 2,493,307 | Moore et al. | Jan. 3, 1950 |
| 2,598,420 | Onksen | May 27, 1952 |
| 2,682,624 | Atkins | June 29, 1954 |
| 2,741,725 | Thomas | Apr. 10, 1956 |

OTHER REFERENCES

Seely: "Electron Tube Circuits," McGraw-Hill Book Co., Inc., New York, 1950, pp. 116 and 117.